(12) United States Patent
Roller et al.

(10) Patent No.: US 6,396,317 B1
(45) Date of Patent: May 28, 2002

(54) DIGITAL VOLTAGE CONTROLLED OSCILLATOR

(75) Inventors: John Roller; Jon Drew Karnes, both of Galion, OH (US)

(73) Assignee: Peco II, Inc.,, Galion, OH (US)

( * ) Notice: Subject to any disclaimer, the term of this patent is extended or adjusted under 35 U.S.C. 154(b) by 0 days.

(21) Appl. No.: 09/323,185

(22) Filed: May 28, 1999

(51) Int. Cl.[7] .............................................. H03B 19/00
(52) U.S. Cl. ........................ 327/113; 327/182; 327/175
(58) Field of Search ................................. 327/113, 129, 327/182, 184, 175, 176, 291, 134, 156, 159, 172; 331/74; 395/555

(56) References Cited

U.S. PATENT DOCUMENTS

| | | | |
|---|---|---|---|
| 3,824,498 A | | 7/1974 | McBride ..................... 332/117 |
| 3,943,814 A | | 3/1976 | Wemekamp ................ 84/1.01 |
| 4,105,939 A | | 8/1978 | Culbertson ................. 318/599 |
| 4,342,050 A | * | 7/1982 | Traino ........................ 358/406 |
| 4,584,658 A | | 4/1986 | Ottobre et al. ............. 708/276 |
| 4,665,372 A | | 5/1987 | Schwartz .................... 327/105 |
| 4,672,568 A | * | 6/1987 | Taylor ........................ 708/276 |
| 4,943,779 A | * | 7/1990 | Pedersen et al. ........... 327/106 |
| 5,012,437 A | * | 4/1991 | Recker et al. .............. 708/108 |
| 5,050,085 A | | 9/1991 | Wright ................... 364/431.11 |
| 5,166,793 A | * | 11/1992 | Furukawa et al. .......... 348/536 |
| 5,216,389 A | | 6/1993 | Carralero et al. ............ 331/18 |
| 5,254,960 A | | 10/1993 | Hikichi ........................ 331/46 |
| 5,260,650 A | * | 11/1993 | Schwesig et al. ........... 324/163 |
| 5,325,074 A | | 6/1994 | Suenaga ...................... 331/46 |
| 5,369,375 A | * | 11/1994 | Cooper et al. | |
| 5,541,543 A | * | 7/1996 | Arnaud | |
| 5,606,293 A | | 2/1997 | Matsui et al. ................. 331/74 |
| 5,649,320 A | | 7/1997 | Korhonen et al. ........ 455/196.1 |
| 5,663,945 A | * | 9/1997 | Hayashi et al. ............. 369/124 |
| 5,673,424 A | | 9/1997 | Sawamura ................... 395/555 |
| 5,689,214 A | | 11/1997 | Navaz ......................... 331/158 |
| 5,726,607 A | | 3/1998 | Brede et al. .................... 331/2 |
| 5,731,773 A | * | 3/1998 | McCune, Jr. ............... 327/129 |
| 5,796,312 A | | 8/1998 | Hull et al. .................... 331/44 |
| 6,118,680 A | * | 9/2000 | Wallace et al. ............... 363/71 |

FOREIGN PATENT DOCUMENTS

GB        2 062 990 A       5/1981

OTHER PUBLICATIONS

Peter H. Saul and David G. Taylor, *High–Speed Direct Frequency Synthesizer*, IEEE Journal of Solid–State Circuits, dated Feb. 25, 1999.

M. B. Sandler, *Digital–to–Analogue Conversion Using Pulse Width Modulation*, Electronics & Communication Journal, dated Dec. 5, 1993.

* cited by examiner

Primary Examiner—Terry D. Cunningham
Assistant Examiner—Paul Dinh
(74) Attorney, Agent, or Firm—Marshall, Gerstein, & Borun (57) ABSTRACT

A digital voltage controlled oscillator is disclosed. The digital voltage controlled oscillator includes an input for receiving input signals representative of a desired frequency. It also includes a pulse generator and a logic circuit. The logic circuit develops an oscillating signal having a predefined waveform and the desired frequency by controlling the energy contained in the pulses output by the pulse generator. The disclosed digital voltage controlled oscillator also includes a capacitor which is charged by the pulses to a voltage that generally varies in accordance with the predefined waveform and the desired frequency.

36 Claims, 6 Drawing Sheets

DIGITAL VOLTAGE CONTROLLED OSCILLATOR

RELATED APPLICATION

This application is related to U.S. application Ser. No. 09/322,726, now U.S. Pat. No. 6,118,680, filed May 28, 1999.

FIELD OF THE INVENTION

The invention relates generally to voltage controlled oscillators, and, more particularly, to a digital voltage controlled oscillator.

BACKGROUND OF THE INVENTION

Voltage controlled oscillators ("VCOs") are used in many applications to produce an oscillating signal having a frequency defined by an input voltage. Generally speaking, there are two types of voltage controlled oscillators, namely, non-crystal voltage controlled oscillators (hereinafter "non-crystal VCOs") and crystal voltage controlled oscillators (hereinafter "VCXOs"). Both types of known VCOs suffer from certain disadvantages. For example, non-crystal VCOs usually exhibit poor stability characteristics (e.g., the frequency of the oscillating output signal drifts), and typically include an excessively large frequency range (e.g., 2:1 to 10:1 frequency adjust). On the other hand, while VCXOs are very stable, they tend to be expensive and have small frequency ranges. VCXOs are also usually limited to outputting a square wave. The square wave output is passed through a low pass filter to produce a sinusoidal wave, when desired.

SUMMARY OF THE INVENTION

In accordance with an aspect of the invention, a digital voltage controlled oscillator (DVCO) is provided. The DVCO includes an input for receiving input signals representative of a desired frequency. It also includes a pulse generator for generating pulses and a logic circuit in communication with the input and the pulse generator. The logic circuit is adapted to develop an oscillating signal having a predefined waveform and the desired frequency by controlling the energy contained in the pulses output by the pulse generator. The DVCO also includes a capacitor in communication with the pulse generator. The capacitor is charged by the pulses to a voltage that generally varies in accordance with the predefined waveform and the desired frequency.

In accordance with another aspect of the invention, a digital voltage controlled oscillator is provided. The DVCO includes an input for receiving voltage signals, and a duty cycle register for temporarily storing duty cycle values. The DVCO also includes a PWM generator in communication with the duty cycle register for developing an output pulse having a duty cycle specified by the duty cycle in the duty cycle register, and a waveform table storing a plurality of duty cycle values. Additionally, the DVCO is provided with a waveform controller in communication with the input for setting a frequency in accordance with the voltage signals received by the input. The waveform controller is in communication with the waveform table for sequentially writing duty cycle values to the duty cycle register at a rate defined by the frequency. The DVCO is further provided with a low pass filter in communication with the pulse generator for developing an oscillating waveform having a shape defined by the duty cycle values stored in the waveform table and a frequency defined by the voltage signals received by the input.

In some embodiments, the DVCO also includes a waveform corrector cooperating with the waveform controller to selectively adjust the rate at which the duty cycle values are written to the duty cycle register. In some such embodiments, the waveform corrector varies the rate at substantially evenly spaced time intervals within a waveform cycle to limit distortion of the oscillating waveform.

In accordance with still another aspect of the invention, a method is provided for providing a voltage controlled oscillating signal with a programmed logic circuit comprising a PWM generator. The method includes the step of creating a table of duty cycle values. Each of the duty cycle values corresponds to a predefined point on a predetermined waveform associated with the oscillating signal. The method also includes the steps of:

receiving a voltage signal indicative of a desired frequency for the oscillation signal; developing a first period from the voltage signal; sequentially delivering the duty cycle values to the PWM generator at a rate defined by the first period; and sequentially outputting pulses with the PWM generator to a capacitor. The pulses have duty cycles corresponding to the duty cycle values. The voltage across the capacitor defines the oscillating signal.

In some embodiments, the method further includes the step of selectively adjusting the rate at which the duty cycle values are delivered to the PWM generator.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
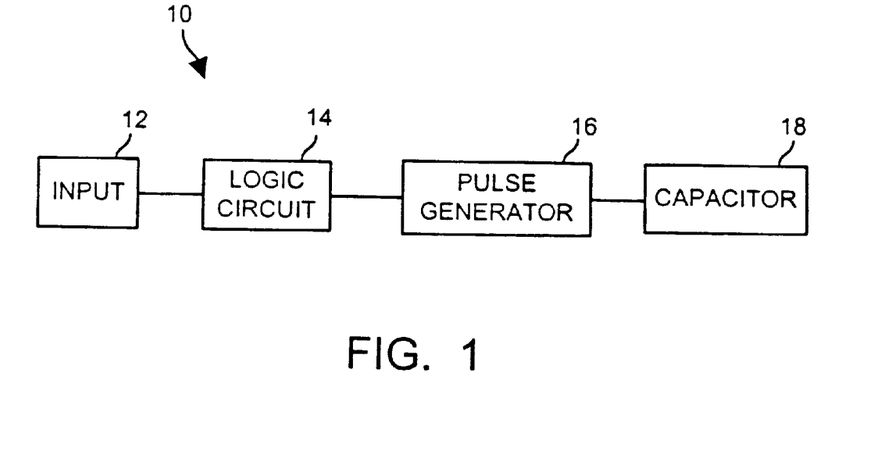
FIG. 1 is a schematic illustration of a digital voltage controlled oscillator constructed in accordance with the teachings of the instant invention.

A digital voltage controlled oscillator (DVCO) 10 constructed in accordance with the teachings of the invention is shown generally in FIG. 1. As explained in detail below, the disclosed DVCO 10 produces an oscillating output signal having a frequency which is dependent on a voltage input signal received at an input 12. The oscillating output signal can have virtually any waveform, including, by way of examples, not limitations, sinusoidal waveforms such as sine and cosine waveforms, trapezoidal waveforms and sawtooth waveforms without departing from the scope or spirit of the invention. As also explained in detail below, the disclosed DVCO 10 is implemented by a microcontroller executing programmed steps. However, persons of ordinary skill in the art will readily appreciate that the DVCO can be implemented by firmware or software executing on a microprocessor or microcontroller and/or by hardwired logic circuit (s) without departing from the scope or spirit of the invention.

As mentioned above, the DVCO 10 includes an input 12 for receiving input signals representative of a desired frequency. The DVCO 10 also includes a logic circuit 14, a pulse generator 16, and a capacitor 18 (see FIG. 1). As its name suggests, the pulse generator 16 is adapted to output electrical pulses which are used to charge the capacitor 18. The logic circuit 14, which is in communication with the input 12 and the pulse generator 16, is adapted to control the pulse generator 16 to define the amount of energy contained in the pulses delivered to the capacitor 18. In particular, the logic circuit 14 is adapted to vary the output pulses of the pulse generator 16 to produce a voltage at the capacitor 18 that is representative of an oscillating signal having a predefined waveform and having the frequency specified by the signals received at the input 12.

Figure 2:
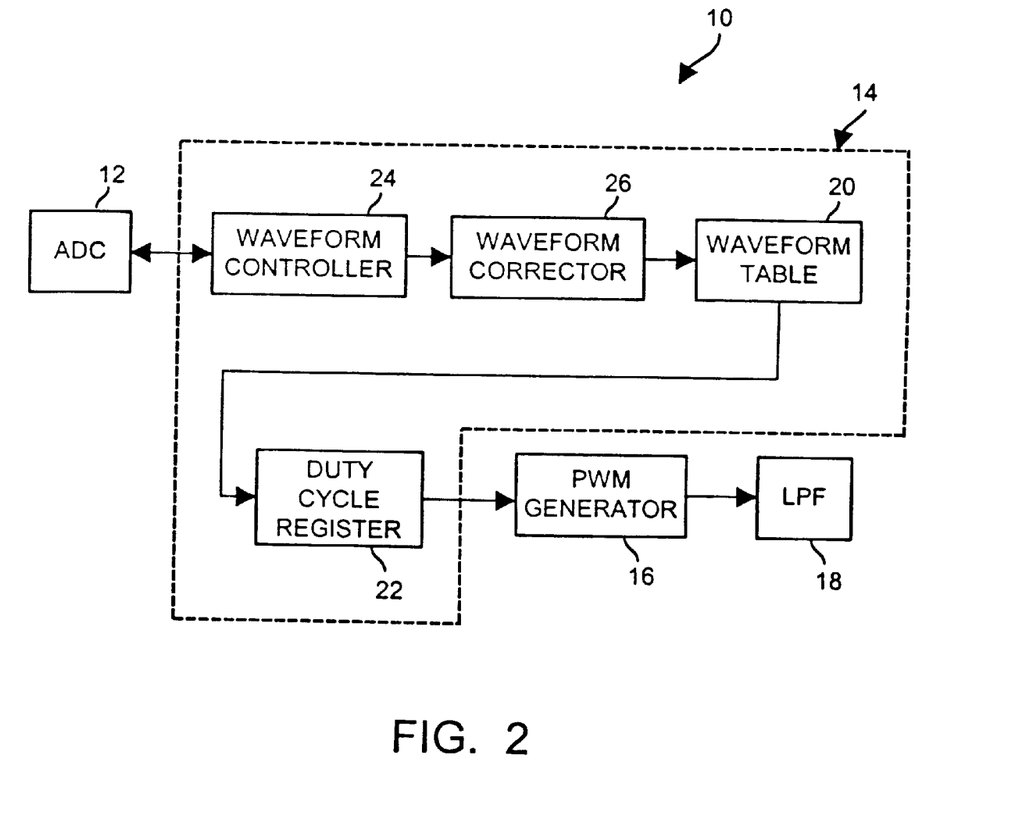
FIG. 2 is a more detailed view of the DVCO of FIG. 1.

A more detailed view of the DVCO 10 is shown in FIG. 2. As shown in that figure, the input 12 is preferably implemented by an analog to digital converter; the pulse generator 16 is preferably implemented by a pulse width modulated pulse generator (PWM generator); and the capacitor 18 is preferably part of a conventional low pass filter including a resistor.

The logic circuit 14 controls the amount of energy delivered to the low pass filter 18 at any given time by controlling the duty cycles of the pulses output by the PWM generator 16. The duty cycles can preferably vary between 0 and 100% as a function of the desired output waveform. To this end, the logic circuit 14 includes a waveform table 20 which stores a plurality of duty cycle values. These values are calculated by dividing one cycle of the desired waveform (e.g., a sine wave) into a plurality of intervals. In the preferred embodiment, the waveform is split into seventy-two intervals with one pulse of the PWM generator 16 occurring in each interval. (Persons of ordinary skill in the art will appreciate, however, that a different number of intervals can be used without departing from the scope or spirt of the invention.) The amount of energy needed to produce a voltage on the capacitor 18 that varies with the desired waveform is then calculated for each of the seventy-two intervals. These calculations are converted into seventy-two duty cycle values which are stored in the waveform table 20.

By way of a more concrete example, assuming the desired waveform is a sine wave and seventy-two intervals have been selected, the maximum positive voltage on the capacitor should occur at 90° (i.e., the 18th interval). The energy delivered to the capacitor 18 during the 18th interval should be maximized relative to the other intervals. Therefore, the duty cycle of the pulse associated with the 18th interval could be selected as 1. Since a sine wave crosses zero at 180° and 360° (i.e., the 36th and 72nd interval), the duty cycles of the pulses generated in the 36th and 72nd interval should be 0.5 and zero at 270°. Appropriate duty cycles for the remaining points should vary as a function of the desired waveform (e.g., sin(x)), and can be calculated using well known mathematical techniques.

For the purpose of sequentially delivering the duty cycle values to the pulse width generator 16, the logic circuit 14 is provided with a duty cycle register 22. The duty cycle register 22 temporarily stores one of the duty cycle values from the waveform table 20. The duty cycle value in the register 22 is communicated to the PWM generator 16 each interval to define the positive going width (i.e., the duty cycle) of the pulse output to the capacitor 18 during that interval.

To control the rate at which the duty cycle values are written to the duty cycle register 22, the rate at which duty cycle values are provided to the PWM generator 16, and, thus, the rate at which pulses are output by the generator 16, the logic circuit 14 is further provided with a waveform controller 24. As shown in FIG. 2, the waveform controller 24, which is preferably implemented by firmware, is in communication with the ADC 12. The waveform controller 24, thus, periodically reads the digitized value output by the ADC 12 to determine if a new frequency is desired. If a new frequency is desired, the waveform controller 24 makes a proportional adjustment to the rate at which it causes the duty cycle values to be written from the waveform table 20 to the duty cycle register 22 and the rate at which the PWM generator 16 outputs pulses.

Although optional, in the preferred embodiment, the logic circuit 14 is also provided with a waveform corrector 26 which functions to correct frequency errors that would otherwise be induced at some frequencies by a strict seventy-two equal period approach. In particular, because the desired waveform period will not always divide evenly by seventy-two intervals, a certain amount of frequency error could result. To avoid such error, the waveform corrector 26 periodically varies the rate at which the duty cycle values are changed in the duty cycle register 22 and the rate at which the PWM generator creates pulses. Specifically, the waveform corrector 26 lengthens the duration of some of the seventy-two intervals to ensure the seventy-two intervals cover the entire period associated with the desired frequency. Preferably, the lengthened intervals are evenly distributed throughout the waveform cycle so as to minimize distortion of the waveform.

Figure 3:
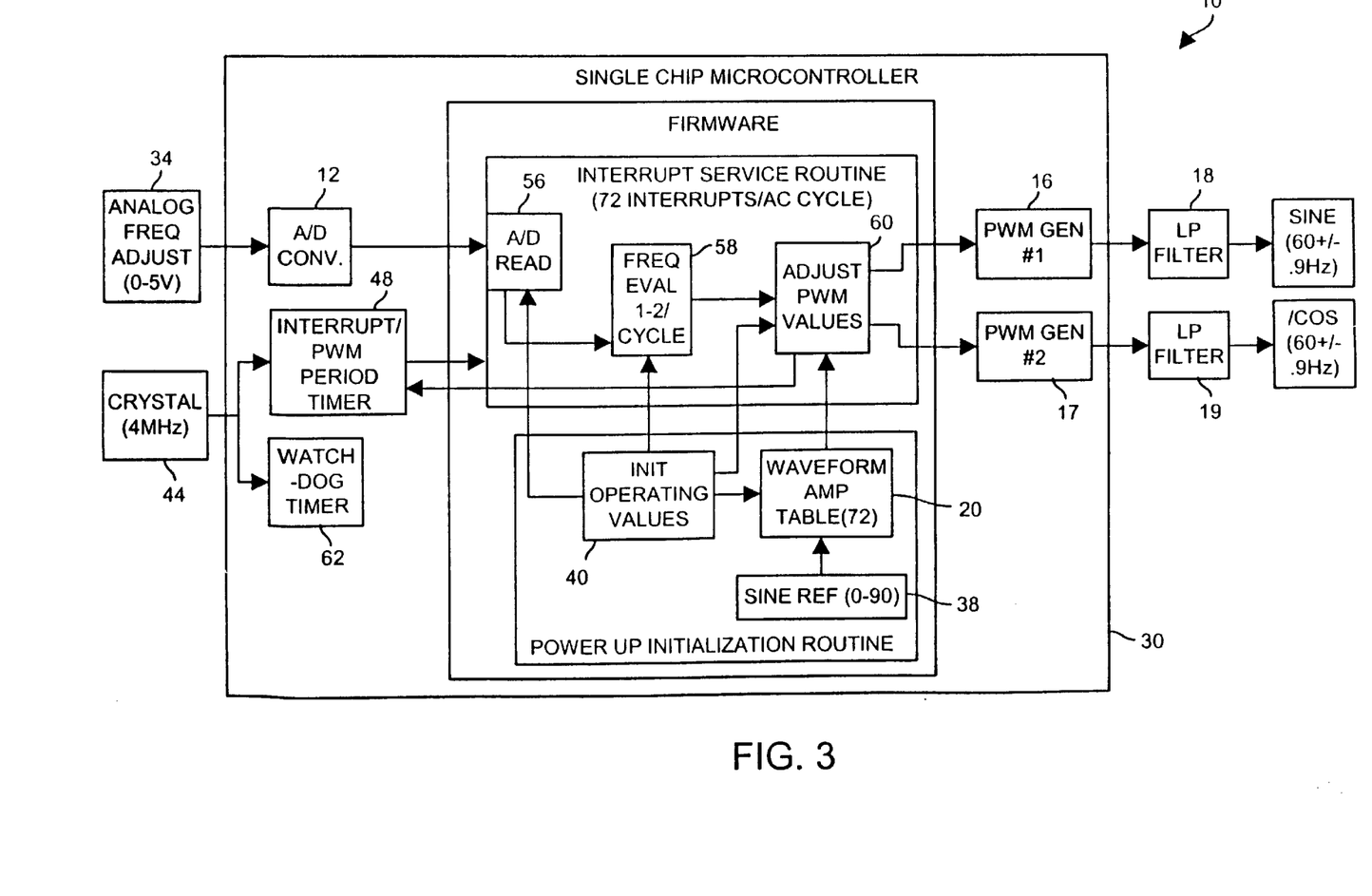
FIG. 3 is a block diagram illustrating a preferred implementation of the DVCO of FIG. 1.

A more detailed block diagram illustrating a preferred implementation of the disclosed DVCO 10 is shown in FIG. 3. As mentioned above, the DVCO 10 is preferably implemented on a microcontroller 30. As shown in FIG. 3, a microcontroller 30 such as the PIC16C74 sold by Microchip is presently preferred in this role because it includes an on-board ADC 12 and two on-board PWM generators 16, 17. However, persons of ordinary skill in the art will readily appreciate that other microcontrollers or microprocessors can be used in this role without departing from the scope or spirit of the invention.

As shown in FIG. 3, an analog frequency adjust circuit 34 of conventional design is preferably coupled to the ADC 12. The ADC 12 is preferably an 8 bit converter and is preferably configured to develop an 8 bit digital value from 0 to 255 in direct proportion to an analog voltage signal between 0 and 5 volts delivered by the circuit 34. Although in the preferred embodiment, the relationship between the analog input voltage and the digital output of the ADC 12 is linear, non-linear arrangements can be utilized, if desired, without departing from the scope or spirit of the invention.

For the purpose of developing the waveform table 20, the microcontroller 30 includes a reference table 38. Since in the illustrated embodiment, the DVCO 10 outputs two waveforms, namely, a cosine wave and a sine wave, the reference table 38 preferably includes duty cycle values for a sine wave. To save read only memory, duty cycle values are only stored for the first 90 degrees of the sine wave as the remaining duty cycle values (i.e., the values for 90° to 360°) can be easily calculated from the duty cycle values for the first ninety degrees. Preferably, each duty cycle value is represented by an unsigned thirty-two bit integer.

The waveform table 20 which contains duty cycle values for each of the seventy-two intervals of the waveform is ultimately created from the reference table 38. In particular, at start-up, the waveform table 20 is created in volatile memory (not shown) and the nineteen duty cycle values in the reference table 38 are used to populate the seventy-two duty cycle values of the waveform table 20 using well known mathematical formulas.

Although the illustrated DVCO 10 utilizes the reference table 38 as a means to conserve memory, persons of ordinary skill in the art will readily appreciate that it can be replaced with a complete waveform table 20 without departing from the scope or spirit of the invention. Similarly, although in the illustrated DVCO 10, the complete waveform table 20 is populated at start-up, persons of ordinary skill in the art will readily appreciate that the duty cycle values can be calculated on the fly on an as-needed basis from the reference table 38 without departing from the scope or spirit of the invention. In other words, the teachings of the invention do not require the waveform table 20 to exist as a whole at any given time.

As shown in FIG. 3, the microcontroller 30 also stores a plurality of initial operating values 40 in read only memory (not shown). These operating values 40 defines such parameters as the limits on the frequency range (i.e., the minimum and maximum time between pulse intervals which, of course, define the maximum and minimum frequencies for the oscillating output signal(s)), resolution (i.e., the smallest possible difference between pulse intervals (e.g., f1-f2=resolution, where f1 and f2 are immediately adjacent frequencies), and a default PWM period value (i.e., the length of each of the seventy-two intervals in time) to be used at start-up until a replacement value is obtained via the ADC 12. In the preferred DVCO 10, the frequency range is approximately 59–61 Hz (frequencies outside of this range can be achieved by selecting alternate hardware components (e.g., a different crystal clock, a different microcontroller and/or a different capacitor) without departing from the scope or spirit of the invention), the control resolution is approximately 2 microseconds, and the default PWM period value is the smallest possible interval (16,412 microseconds). These initial values 40 may also define the initial relationship (e.g., linear) between the 0–5 volt analog input voltage and the 0–255 digital output value.

Figure 4:
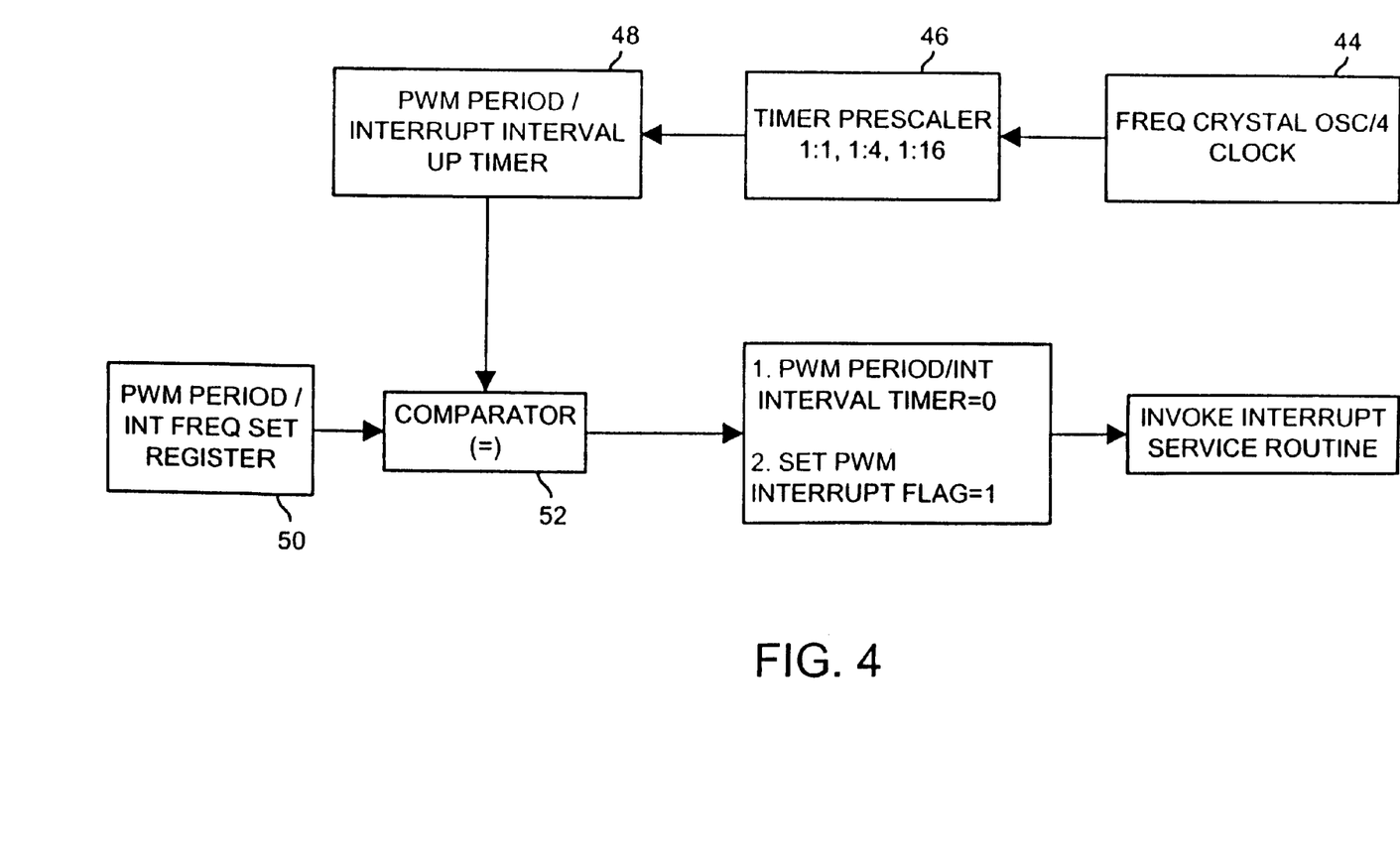
FIG. 4 is a block diagram representing the interrupt timing control of the DVCO of FIG. 3.

The length of the PWM periods (i.e., the durations of the seventy-two intervals) and the times at which interrupts occur are based upon the output signal of a crystal clock 44. As shown in FIG. 3, the crystal clock 44 preferably operates at 4 MHZ. To scale the frequency of the clock down to an appropriate level, the microcontroller 30 is provided with a timer prescaler 46 (See FIG. 4). The scaled clock signal is input to a counter 48 labeled an interrupt/PWM period timer in FIGS. 3 and 4. As shown in FIG. 4, the value in the interrupt/PWM period timer 48 is compared to a value stored in a PWM period/interval frequency setting register 50 by a comparator 52. The value in the PWM period register 50 is set by the microcontroller 30 as explained in detail below. In any event, whenever the value in the interrupt interval timer 48 matches the value in the PWM period register 50, the microcontroller 30 resets the interrupt interval timer 48 and initiates an interrupt service routine described below. Since in the preferred implementation, each cycle of the output waveform is divided into seventy-two intervals, the interrupt service routine will be called seventy-two times a cycle (i.e., every five degrees).

As shown in FIG. 3, the interrupt service routine performs two basic functions. It determines whether the frequency of the oscillating output signal must change, and it adjusts the duty cycles of the pulses generated by the PWM generators 16, 17 in accordance with the values in the waveform table 20. To the former end, the microcontroller 30 is provided with A/D read firmware 56 and frequency evaluation firmware 58. The A/D read firmware 56 and the frequency evaluation firmware 58 cooperate to periodically read an ADC result register (not shown) associated with the ADC 12 to determine if a voltage requiring a change in the frequency of the output signal has been received. If so, the frequency evaluator firmware 58 is adapted to calculate a new PWM period value and to update the PWM period register 50 (see FIG. 4) with the updated value. As shown in FIG. 4, by changing the value in the PWM period register 50, the microcontroller 30 changes the rate at which interrupts occur. Since there are always seventy-two intervals per waveform cycle and the occurrence of an interrupt begins a new interval, increasing the rate at which interrupts occur increases the frequency of the oscillating output signal. Likewise, decreasing the rate at which interrupts occur, decreases the frequency of the oscillating output signal.

Although persons of ordinary skill in the art will readily appreciate that other approaches may be taken to frequency control without departing from the scope or spirit of the invention, in the disclosed DVCO 10 frequency is evaluated two times a waveform cycle, namely, at twenty degrees before the positive going zero crossing point (interrupt interval 69) and at twenty degrees before the negative going zero crossing (i.e., interrupt interval 33).

The second function of the interrupt service routine is to adjust the duty cycles of the pulses generated by the PWM generators 16, 17 to produce the desired output waveforms at the outputs of the low pass filters 18, 19. This function is performed by the firmware 60 represented by the block labeled "Adjust PWM Values" in FIG. 3. Specifically, the firmware 60 causes the microcontroller 30 to respond to each interrupt by loading the next duty cycle value(s) from the waveform table 20 into respective ones of the PWM generators 16, 17. The adjust PWM values firmware 60 also causes the microcontroller 30 to periodically increase the value in the PWM period register 50 by a predetermined amount (preferably one microsecond) to cause an extended interval to occur. As explained above, such extended intervals are used to ensure the oscillating waveform has the desired frequency. As also explained above, these extended intervals are preferably evenly distributed throughout the cycle to minimize waveform distortion. To this end, the adjust PWM values firmware 60 also operates to return the value in the PWM period register 50 to its normal level until it again becomes time for an extended interval.

As shown in FIG. 3, the microcontroller 30 is preferably provided with a watchdog timer 62. The watchdog timer 62 functions to ensure each step is executed within the seventy-two interrupts. If an error occurs, it will reset the microcontroller 30.

Figure 5:
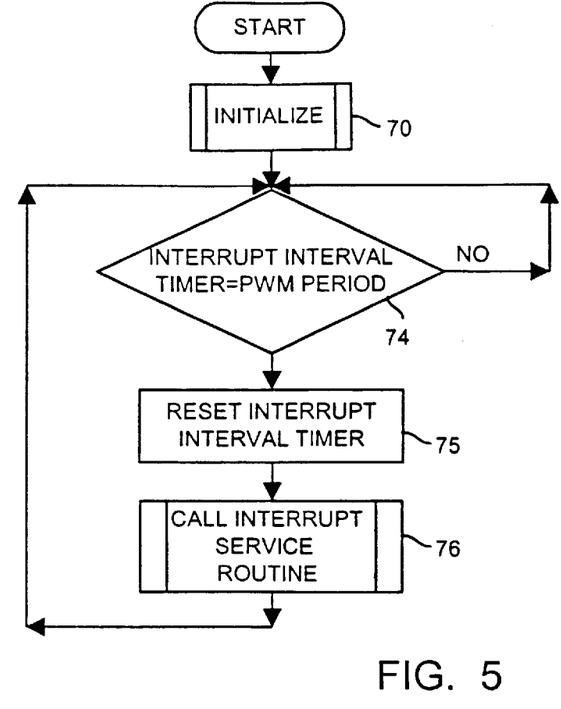
FIG. 5 is a flow chart illustrating a preferred program executed by he microcontroller of FIG. 3.
Figure 6:
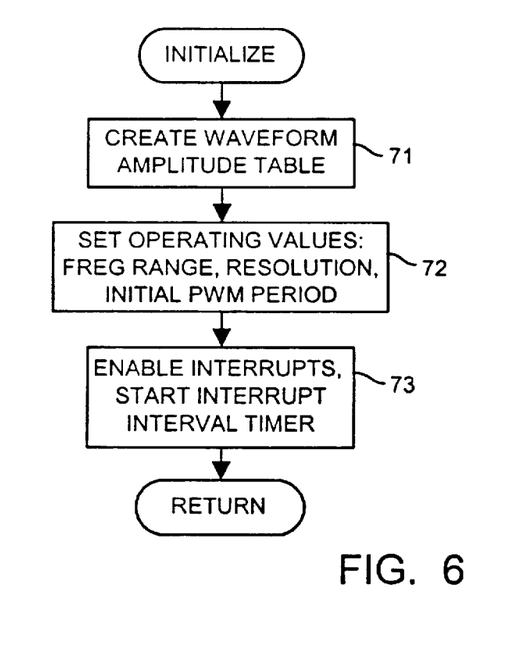
FIG. 6 is a flow chart illustrating the initialize routine called by the program of FIG. 5.
Figure 7A:
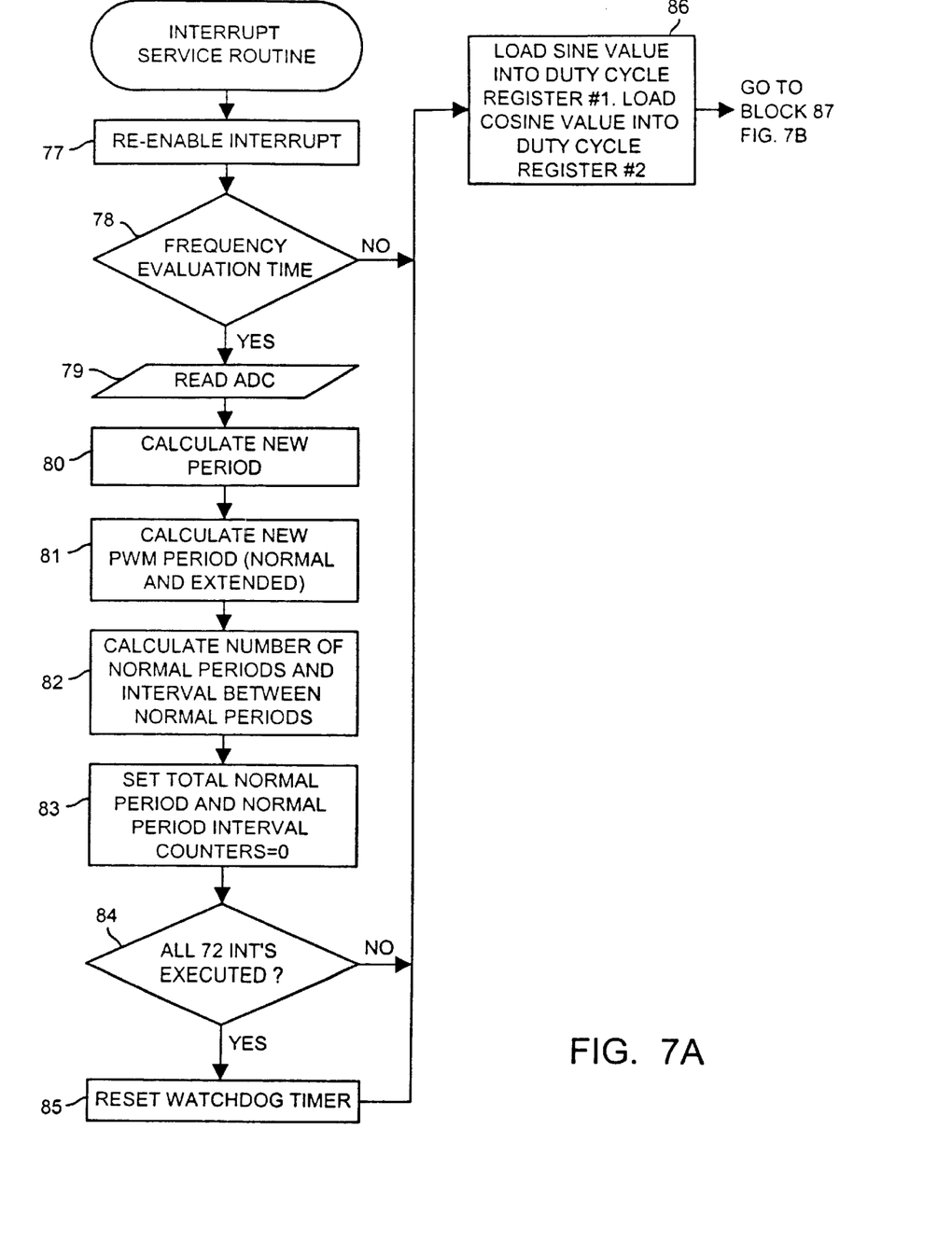
FIGS. 7A–7B are a flow chart illustrating the interrupt service routine called by the program of FIG. 5.
Figure 7B:
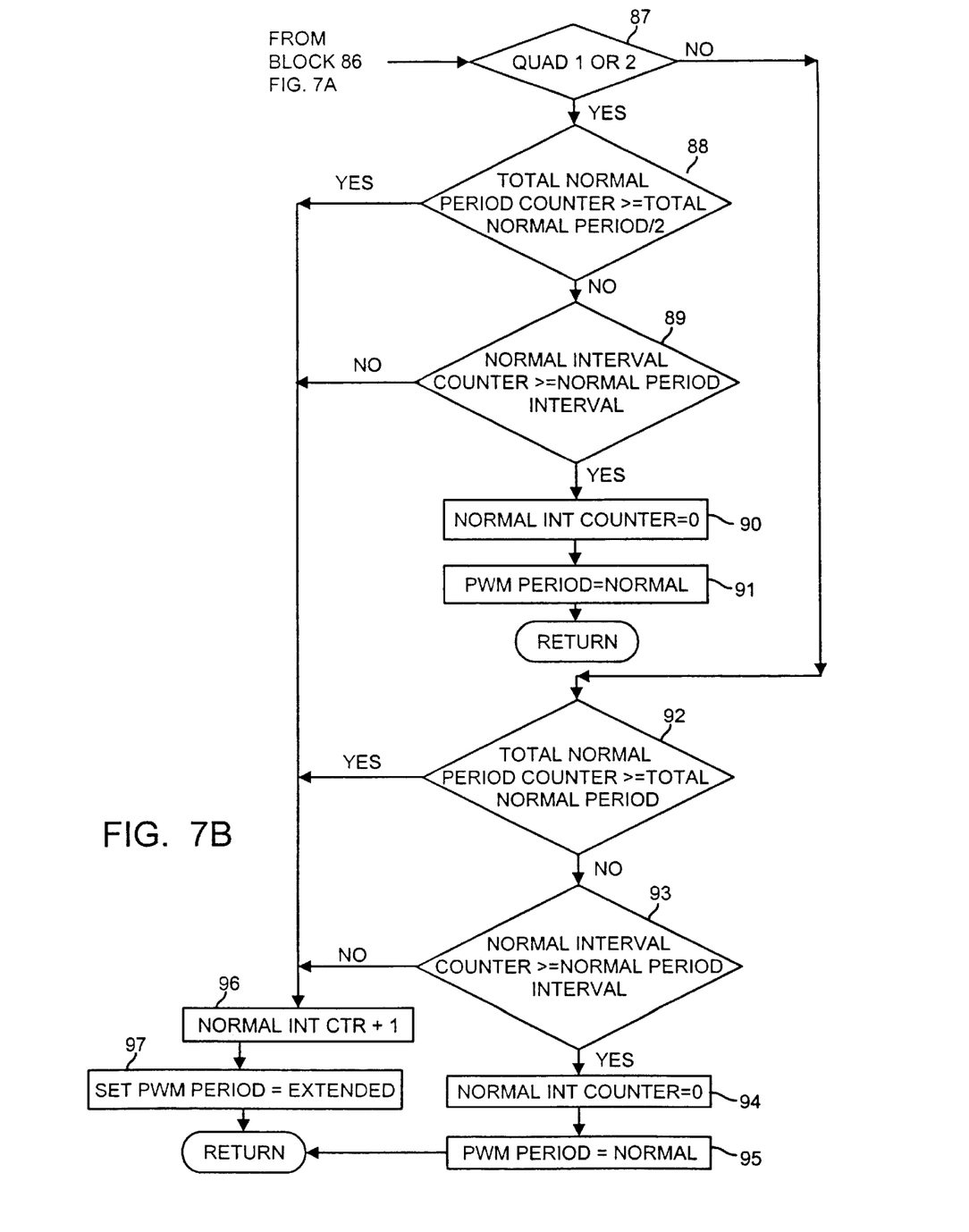

The operation of the disclosed DVCO 10 will now be explained in more detail in connection with the flowcharts illustrated in FIGS. 5–7. While the flowcharts of FIGS. 5–7 illustrate a preferred exemplary program for implementing the teachings of the invention, persons of ordinary skill in the art will readily appreciate that many different approaches to implementing the programmed steps can be followed without departing from the scope or spirit of the invention. Further, although the flowcharts illustrate steps performed in a certain order, persons of ordinary skill in the art will appreciate that the invention is in no way limited to any temporal sequence.

Turning to FIG. 5, at start-up, the microcontroller 30 calls the initialize routine (block 70). As shown in FIG. 6, the initialize routine primarily addresses certain housekeeping tasks. For example, at block 71, the microcontroller 30 performs the calculations necessary to create the waveform table 20 from the reference table 38. As explained above, the values in the waveform table 20 are dependent upon the desired waveform. In the illustrated DVCO 10, the desired waveform is a sine wave and a cosine wave (see FIG. 3) which can both be developed from the same waveform table 20.

In any event, at block 72, the microcontroller 30 retrieves certain operating values from its on-board ROM. These values preferably include the frequency range values, the resolution value and the initial PWM period value explained above. The initial PWM period value is loaded into the PWM period register 50 (see FIG. 4) to ensure an interrupt occurs. Preferably, the initial PWM period value is the shortest possible period to ensure the interrupts occur at the fastest possible rate until the first frequency evaluation (i.e., ADC read) occurs and the frequency/PWM period is adjusted to the level specified by the input voltage.

In the disclosed DVCO 10, the shortest PWM period for the highest possible sine frequency is:

$$\text{INT}((\text{INT}((1/60 \text{ Hz})*1{,}000{,}000)-255 \ \mu s)/72 \text{ steps})=227 \ \mu s.$$

After the operating values are set, control proceeds to block 73. At block 73, the microcontroller 30 enables the interrupts and starts the interrupt interval timer 48. Control then returns to block 74 of the main routine (FIG. 5).

At block 74, the microcontroller 30 enters a loop wherein it waits until the comparator 52 indicates that the interrupt timer 48 has reached the value specified in the PWM period register 50. Once this occurs, a new PWM period begins, the interrupt interval timer 48 is reset to zero (block 75) and the interrupt service routine is called (block 76).

The interrupt service routine (FIGS. 7A–7B) begins by re-enabling the interrupt flag (block 77). The waveform controller 24 then determines whether it is time to check the ADC 12 for a new frequency (block 78). As mentioned above, in the disclosed DVCO 10, the frequency check (ADC read) occurs at 160 degrees and 340 degrees (i.e., at the 33rd interrupt and the 69th interrupt within a waveform cycle). However, additional checks, fewer checks and/or checks at different intervals can be performed without departing from the scope or spirit of the invention. If it is not time to evaluate the frequency, control proceeds to block 86. Otherwise, control proceeds to block 79.

Assuming for discussion purposes that a frequency evaluation time has arrived (block 78), the waveform controller 24 reads the ADC 12 (block 79). Once the output of the ADC 12 is obtained (e.g., a digital number between 0 and 255), the waveform controller 24 calculates a new PWM period (block 80). The new waveform period is calculated by the following equation:

$$\text{New Waveform Period}=16{,}667+(127-\text{control result})*2 \ \mu s$$

where the control result is the output of the ADC 12 (i.e., a number between 0 and 255).

After the new waveform period is calculated (block 80), the waveform controller 24 calculates a new PWM period and a new extended PWM period (block 81). The new PWM period is calculated with the following equation:

$$\text{PWM Period}=\text{INT (New Waveform Period/72)}.$$

The extended PWM period is calculated according to the following equation:

$$\text{Extended PWM Period}=\text{PWM Period}+1 \ \mu s.$$

Based upon the remainder resulting from the calculation of the PWM period (i.e., New Waveform Period/72), there will be a need to insert extended periods during the waveform to ensure the output waveform has the desired frequency. The extended periods should be substantially evenly distributed across all four quadrants of the waveform to minimize distortion of the output waveform. At block 82, the waveform controller 24 calculates the number of extended periods required during a cycle of the waveform via the following equation:

$$\text{Number of Extended Periods}=\text{ABS (INT (New Waveform Period/72)}-\text{New Waveform Period/72)}*72.$$

The number of intervals between extended periods is also calculated at block 82 by the following equation:

$$\text{Extended Period Interval}=72/\text{Number of Extended Periods}.$$

Once these calculations are completed, the waveform controller 24 sets both a total PWM (normal) periods counter and a PWM (normal) period interval counter to zero (block 83).

At block 84, the microcontroller 30 determines whether all seventy-two interrupts have occurred. If so, the watchdog timer 62 is reset (block 85). Otherwise, control proceeds to block 86. As explained above, if the watchdog timer 62 is not reset within a predefined time period (i.e., all seventy-two interrupts are not executed within the predefined time period), the watchdog timer 62 will reset the microcontroller 30 and control will return to block 70 of the main routine (FIG. 5).

Regardless of whether control reaches block 86 from block 78, block 84 or block 85, the waveform controller 86 retrieves the duty cycle values associated with the current interval from the waveform table 20 and respectively loads them into the sine and cosine duty cycle registers 22 (block 86). As is well known, a cosine wave can be thought of as a sine wave shifted in time by 90 degrees. Therefore, the duty cycle value for the cosine duty cycle register can be identified and retrieved by adding eighteen to the current interval number in the total interval counter and accessing the waveform table 20 based on that calculation. The sine duty cycle value is retrieved by simply accessing the duty cycle value corresponding to the current interval number. When the duty cycle values are loaded into their respective registers 22, the PWM generators 16, 17 generate pulses having widths dictated by the values in their respective registers. Control then proceeds to block 87.

At block 87, the waveform corrector 26 determines whether the current interval occurs in the first half cycle of the waveform (i.e., in quadrant 1 or 2). If not, control proceeds to block 92. Otherwise, control proceeds to block 88.

Assuming for the moment that the current interval is in the first half cycle, at block 88 the waveform corrector 26 determines whether half of the normal PWM periods to occur in the waveform cycle have already occurred. If so, control proceeds to block 96. Otherwise control proceeds to block 89. The check at block 88 is performed to ensure the total number of normal PWM periods are substantially evenly distributed between the first and second halves of the waveform cycle.

If the number of normal PWM periods assigned to the first half of the waveform cycle have not been exceeded (block 88), the waveform corrector 26 then compares the value in the normal interval counter to the normal PWM interval variable to determine if it is time to insert a normal PWM period (block 89). This step is performed to ensure the normal PWM periods are evenly distributed throughout the waveform cycle.

If it is time for a normal PWM period, the waveform corrector 26 resets the normal interval counter (block 90) and sets the PWM period register 50 to the normal PWM period value (block 91). Control then returns to block 74 of FIG. 5 to await the occurrence of the next interval.

If it is not time for a normal PWM period (block 89), the waveform corrector 26 increments the normal interval counter (block 96) and sets the PWM period register 50 to the extended PWM period value (block 97). Control then returns to block 74 of FIG. 5.

If at block 87, the waveform corrector 26 determines that the current interval occurs in the second half of the waveform cycle, control proceeds to block 92. At block 92, the waveform corrector 26 compares the total normal PWM period counter to the total normal PWM period variable to determine whether the total number of normal PWM periods for the current waveform cycle have already been performed. If so, control proceeds to blocks 96 and 97 where the normal interval counter is incremented and the PWM period register 50 is set to the extended PWM period value.

If the total number of PWM periods have not been executed for the current waveform (block 92), the waveform corrector 26 determines whether it is time for a normal PWM period (block 93). If it is time for a normal PWM period, the normal interval counter is reset (block 94), the value in the PWM period register 50 is set to the normal PWM period value (block 95) and control returns to block 74 of FIG. 5 to await the initiation of the next interval. If it is not time for a normal PWM period (block 93), the waveform corrector 26 increments the normal interval counter (block 96), the value in the PWM period register 50 is set to the extended PWM period value (block 97), and control returns to block 74 of FIG. 5 to await the occurrence of the next interval.

From the foregoing, persons of ordinary skill in the art will appreciate that a DVCO 10 has been disclosed that generates an oscillating output signal whose frequency has the stability typically associated with crystal VCOs but with a flexible frequency adjustment range that is greater than ranges associated with crystal VCOs. Such persons will also appreciate that the disclosed DVCO 10 is low cost relative to its performance. Additionally, persons of ordinary skill in the art will appreciate that the DVCO 10 is not limited to linear control relationships between input and frequency, but instead can be used with a wide variety of control relationships (including non-linear relationships) which are selected to suit the needs of the intended application. Furthermore, it will be appreciated that the disclosed DVCO 10 is flexible in that it can be programmed to develop different output waveforms including by way of examples, not limitations, sinusoidal, sawtooth and/or trapezoidal waveforms.

Moreover, persons of ordinary skill in the art will recognize that, although certain embodiments of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. A digital voltage controlled oscillator comprising:
   an input for receiving input signals representative of a desired frequency;
   at least one pulse width generator for generating pulses, each of the pulses having an amplitude and a width, the amplitudes of the pulses being substantially the same;
   a logic circuit in communication with the input and the pulse generator, the logic circuit being responsive to the input signals to develop an oscillating signal having a predefined waveform and the desired frequency by controlling the widths of the pulses output by the pulse generator; and
   a capacitor in communication with the pulse generator, the capacitor being charged by the pulses to a voltage that generally varies in accordance with the predefined waveform and the desired frequency, wherein the logic circuit includes a memory storing a table of duty cycle values defining the duty cycle of the pulses generated at predefined points along the desired waveform.

2. A digital voltage controlled oscillator as defined in claim 1 wherein the input signals are analog input signals and the input comprises an analog to digital converter for digitizing the analog input signals.

3. A digital voltage controlled oscillator as defined in claim 1 wherein the logic circuit and the pulse generator are part of a programmed microcontroller.

4. A digital voltage controlled oscillator as defined in claim 1 wherein the capacitor is part of a low pass filter.

5. A digital voltage controlled oscillator as defined in claim 1 wherein the predefined waveform comprises a sine wave.

6. A digital voltage controlled oscillator as defined in claim 1 wherein the predefined waveform comprises a cosine wave.

7. A digital voltage controlled oscillator as defined in claim 1 wherein the predefined waveform comprises a sawtooth waveform.

8. A digital voltage controlled oscillator as defined in claim 1 wherein the predefined waveform comprises a trapezoidal waveform.

9. A digital voltage controlled oscillator as defined in claim 1 wherein the predefined waveform comprises a sinusoidal wave.

10. A digital voltage controlled oscillator as defined in claim 1 wherein the logic circuit sequentially provides at least some of the representations of the duty cycle values to the pulse generator.

11. A digital voltage controlled oscillator as defined in claim 10 wherein the logic circuit provides the duty cycle values to the pulse generator at a rate associated with the desired frequency.

12. A digital voltage controlled oscillator as defined in claim 11 wherein the logic circuit selectively varies the rate at which the duty cycle values are provided to the pulse generator.

13. A digital voltage controlled oscillator as defined in claim 12 wherein the logic circuit varies the rate at substantially evenly spaced time intervals within a waveform cycle to limit distortion of the predefined waveform.

14. A digital voltage controlled oscillator as defined in claim 1 wherein the pulse generator comprises a first pulse generator and a second pulse generator, and the capacitor comprises a first capacitor and a second capacitor, the first and second capacitors being in communication with the first and second pulse generators, respectively.

15. A digital voltage controlled oscillator as defined in claim 14 wherein the logic circuit controls the first pulse generator such that the voltage across the first capacitor generally defines a sine wave and the logic circuit controls the second pulse generator such that the voltage across the second capacitor generally defines a cosine wave.

16. A digital voltage controlled oscillator comprising:

an input for receiving voltage signals;

a duty cycle register for temporarily storing duty cycle values;

a PWM generator in communication with the duty cycle register for developing an output pulse having a duty cycle specified by the duty cycle value in the duty cycle register;

a waveform table storing a plurality of duty cycle values;

a waveform controller in communication with the input for setting a frequency in accordance with the voltage signals received by the input, the waveform controller also being in communication with the waveform table for sequentially writing duty cycle values to the duty cycle register at a rate defined by the frequency; and a low pass filter in communication with the pulse generator for developing an oscillating waveform having a shape defined by the duty cycle values stored in the waveform table and a frequency defined by the voltage signals received by the input.

17. A digital voltage controlled oscillator as defined in claim 16 further comprising a waveform corrector cooperating with the waveform controller to selectively adjust the rate at which the duty cycle values are written to the duty cycle register.

18. A digital voltage controlled oscillator as defined in claim 17 wherein the waveform corrector varies the rate at substantially evenly spaced time intervals within a waveform cycle to limit distortion of the oscillating waveform.

19. A method of providing a digital voltage controlled oscillating signal with a programmed logic circuit comprising a PWM generator, the method comprising the steps of:

creating a table of duty cycle values, each of the duty cycle values corresponding to a predefined point on a predetermined waveform associated with the oscillating signal;

receiving a voltage signal indicative of a desired frequency for the oscillation signal;

developing a first period from the voltage signal;

sequentially delivering the duty cycle values to the PWM generator at a rate defined by the first period; and sequentially outputting pulses with the PWM generator to a capacitor, the pulses having duty cycles corresponding to the duty cycle values, wherein the voltage across the capacitor defines the oscillating signal.

20. A method as defined in claim 19 further comprising the step of:

selectively adjusting the rate at which the duty cycle values are delivered to the PWM generator.

21. A method as defined in claim 19 further comprising the steps of:

changing the voltage signal to indicate a new desired frequency;

thereafter developing a second period from the changed voltage signal;

sequentially delivering the duty cycle values to the PWM generator at a second rate defined by the second period; and sequentially outputting pulses having duty cycles corresponding to the duty cycle values to develop a second oscillating signal having the new desired frequency.

22. A digital voltage controlled oscillator comprising:

an input for receiving input signals representative of a desired frequency;

a pulse generator for generating pulses;

a logic circuit in communication with the input and the pulse generator, the logic circuit being adapted to develop an oscillating signal having a predefined waveform and the desired frequency by controlling the energy contained in the pulses output by the pulse generator; and a capacitor in communication with the pulse generator, the capacitor being charged by the pulses to a voltage that generally varies in accordance with the predefined waveform and the desired frequency;

wherein the logic circuit sequentially provides at least some representations of duty cycle values to the pulse generator, the logic circuit provides the duty cycle values to the pulse generator at a rate associated with the desired frequency, the logic circuit selectively varies the rate at which the duty cycle values are provided to the pulse generator, and the logic circuit varies the rate at substantially evenly spaced time intervals within a waveform cycle to limit distortion of the predefined waveform.

23. A digital voltage controlled oscillator comprising:

an input for receiving input signals representative of a desired frequency;

a pulse generator for generating pulses;

a logic circuit in communication with the input and the pulse generator, the logic circuit being adapted to develop an oscillating signal having a predefined waveform and the desired frequency by controlling the energy contained in the pulses output by the pulse generator; and a capacitor in communication with the pulse generator, the capacitor being charged by the pulses to a voltage that generally varies in accordance with the predefined waveform and the desired frequency;

wherein the pulse generator comprises a first pulse generator and a second pulse generator, and the capacitor comprises a first capacitor and a second capacitor, the first and second capacitors being in communication with the first and second pulse generators, respectively.

24. A digital voltage controlled oscillator as defined in claim 23 wherein the logic circuit controls the first pulse generator such that the voltage across the first capacitor generally defines a sine wave and the logic circuit controls the second pulse generator such that the voltage across the second capacitor generally defines a cosine wave.

25. A digital voltage controlled oscillator comprising:

an input for receiving input signals representative of a desired frequency;

a pulse generator for generating pulses, each of the pulses having an amplitude and a width, the amplitudes of the pulses being substantially the same;

a logic circuit in communication with the input and the pulse generator, the logic circuit being responsive to the input signals to develop an oscillating signal having a predefined waveform and the desired frequency by controlling the widths of the pulses output by the pulse generator; and a capacitor in communication with the pulse generator, the capacitor being charged by the pulses to a voltage that generally varies in accordance with the predefined waveform and the desired frequency, wherein the logic circuit and the pulse generator are part of a programmed microcontroller, and wherein the logic circuit includes a memory storing a table of duty cycle values defining the duty cycle of the pulses generated at predefined points along the desired waveform.

26. A digital voltage controlled oscillator as defined in claim 25 wherein the logic circuit sequentially provides at least some of the representations of the duty cycle values to the pulse generator.

27. A digital voltage controlled oscillator as defined in claim 26 wherein the logic circuit provides the duty cycle values to the pulse generator at a rate associated with the desired frequency.

28. A digital voltage controlled oscillator as defined in claim 27 wherein the logic circuit selectively varies the rate at which the duty cycle values are provided to the pulse generator.

29. A digital voltage controlled oscillator as defined in claim 28 wherein the logic circuit varies the rate at substantially evenly spaced time intervals within a waveform cycle to limit distortion of the predefined waveform.

30. A digital voltage controlled oscillator comprising:
   an input for receiving input signals representative of a desired frequency;
   a pulse generator for generating pulses, each of the pulses having an amplitude and a width, the amplitudes of the pulses being substantially the same;
   a logic circuit in communication with the input and the pulse generator, the logic circuit being responsive to the input signals to develop an oscillating signal having a predefined waveform and the desired frequency by controlling the widths of the pulses output by the pulse generator; and
   a capacitor in communication with the pulse generator, the capacitor being charged by the pulses to a voltage that generally varies in accordance with the predefined waveform and the desired frequency, wherein the logic circuit and the pulse generator are part of a programmed microcontroller, and wherein the pulse generator comprises a first pulse generator and a second pulse generator, and the capacitor comprises a first capacitor and a second capacitor, the first and second capacitors being in communication with the first and second pulse generators, respectively.

31. A digital voltage controlled oscillator as defined in claim 30 wherein the logic circuit controls the first pulse generator such that the voltage across the first capacitor generally defines a sine wave and the logic circuit controls the second pulse generator such that the voltage across the second capacitor generally defines a cosine wave.

32. A digital voltage controlled oscillator comprising:
   an input for receiving input signals representative of a desired frequency;
   a pulse generator for generating pulses, each of the pulses having an amplitude and a width, the amplitudes of the pulses being substantially the same;
   a logic circuit in communication with the input and the pulse generator, the logic circuit being responsive to the input signals to develop an oscillating signal having a predefined waveform and the desired frequency by controlling the widths of the pulses output by the pulse generator; and
   a capacitor in communication with the pulse generator, the capacitor being charged by the pulses to a voltage that generally varies in accordance with the predefined waveform and the desired frequency, wherein the logic circuit includes a memory storing a table of duty cycle values defining the duty cycle of the pulses generated at predefined points along the desired waveform.

33. A digital voltage controlled oscillator as defined in claim 32 wherein the pulse generator comprises a first pulse generator and a second pulse generator, and the capacitor comprises a first capacitor and a second capacitor, the first and second capacitors being in communication with the first and second pulse generators, respectively.

34. A digital voltage controlled oscillator as defined in claim 33 wherein the logic circuit controls the first pulse generator such that the voltage across the first capacitor generally defines a sine wave and the logic circuit controls the second pulse generator such that the voltage across the second capacitor generally defines a cosine wave.

35. A digital voltage controlled oscillator comprising:
   an input for receiving input signals representative of a desired frequency;
   a pulse generator for generating pulses, each of the pulses having an amplitude and a width, the amplitudes of the pulses being substantially the same;
   a logic circuit in communication with the input and the pulse generator, the logic circuit being responsive to the input signals to develop an oscillating signal having a predefined waveform and the desired frequency by controlling the widths of the pulses output by the pulse generator; and
   a capacitor in communication with the pulse generator, the capacitor being charged by the pulses to a voltage that generally varies in accordance with the predefined waveform and the desired frequency, wherein the logic circuit sequentially provides representations of duty cycle values to the pulse generator, and wherein the pulse generator comprises a first pulse generator and a second pulse generator, and the capacitor comprises a first capacitor and a second capacitor, the first and second capacitors being in communication with the first and second pulse generators, respectively.

36. A digital voltage controlled oscillator as defined in claim 35 wherein the logic circuit controls the first pulse generator such that the voltage across the first capacitor generally defines a sine wave and the logic circuit controls the second pulse generator such that the voltage across the second capacitor generally defines a cosine wave.

* * * * *